(12) United States Patent
Fradet et al.

(10) Patent No.: US 12,110,799 B2
(45) Date of Patent: Oct. 8, 2024

(54) ABRADABLE COATING

(71) Applicant: SAFRAN AIRCRAFT ENGINES, Paris (FR)

(72) Inventors: Guillaume Fradet, Moissy-Cramayel (FR); Laurent Paul Dudon, Moissy-Cramayel (FR); Serge Georges Vladimir Selezneff, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 60 days.

(21) Appl. No.: 17/904,264

(22) PCT Filed: Feb. 15, 2021

(86) PCT No.: PCT/FR2021/050262
§ 371 (c)(1),
(2) Date: Aug. 15, 2022

(87) PCT Pub. No.: WO2021/170933
PCT Pub. Date: Sep. 2, 2021

(65) Prior Publication Data
US 2023/0089114 A1 Mar. 23, 2023

(30) Foreign Application Priority Data

Feb. 25, 2020 (FR) .................... 2001836

(51) Int. Cl.
*F01D 11/12* (2006.01)
*C23C 4/04* (2006.01)
*C23C 4/129* (2016.01)

(52) U.S. Cl.
CPC .............. *F01D 11/122* (2013.01); *C23C 4/04* (2013.01); *C23C 4/129* (2016.01); *F05D 2230/90* (2013.01); *F05D 2300/611* (2013.01)

(58) Field of Classification Search
CPC ........ F01D 11/12; F01D 11/122; F01D 5/288; F05D 2300/11–16; F05D 2300/17–182;
(Continued)

(56) References Cited

U.S. PATENT DOCUMENTS 5,536,022 A * 7/1996 Sileo .................... F01D 11/122
415/174.4
5,780,116 A * 7/1998 Sileo .................... F01D 11/122
427/455
(Continued)

FOREIGN PATENT DOCUMENTS

EP 1010861 A2 6/2000

OTHER PUBLICATIONS

International Search Report received for PCT Patent Application No. PCT/FR2021/050262, mailed on Apr. 30, 2021, 5 pages (2 pages of English Translation and 3 pages of Original Document).

*Primary Examiner* — Brian P Wolcott
(74) *Attorney, Agent, or Firm* — WOMBLE BOND DICKINSON (US) LLP (57) ABSTRACT

The invention relates to an abradable coating for a turbomachine, comprising a mineral compound having a Mohs hardness of 6 or less and a melting temperature of more than 450° C. or even 800° C., and a polymeric compound with a content of between 40% and 70% by volume.

24 Claims, 6 Drawing Sheets

(58) Field of Classification Search
CPC ......... F05D 2300/30; C23C 4/04; C23C 4/06;
C23C 4/11; C23C 4/12; C23C 4/123;
C23C 4/129; C23C 4/131; C23C 4/134;
C23C 4/18; C23C 28/321; B05D 1/08;
B05D 1/10
See application file for complete search history.

(56) References Cited

U.S. PATENT DOCUMENTS

| | | | |
|---|---|---|---|
| 6,089,825 A | 7/2000 | Walden et al. | |
| 6,537,021 B2* | 3/2003 | Howard | C23C 28/027 |
| | | | 428/662 |
| 11,149,354 B2* | 10/2021 | Anand | F01D 11/122 |
| 11,827,986 B2* | 11/2023 | Landwehr | C23C 28/042 |
| 2010/0124616 A1* | 5/2010 | Rosenzweig | C23C 4/18 |
| | | | 427/535 |
| 2019/0048454 A1* | 2/2019 | Schuster | C23C 4/134 |
| 2019/0284673 A1* | 9/2019 | Landwehr | C23C 28/3455 |

* cited by examiner

ABRADABLE COATING

TECHNICAL FIELD

The present invention relates to an abradable coating for a turbomachine, as well as a turbomachine module and a turbomachine comprising such an abradable coating.

This abradable coating can be used in any type of turbomachine, and in particular in civil or military turbojet engines. In particular, this abradable coating is particularly useful in the environments subject to temperatures up to 450° C.

BACKGROUND

In many rotating machines, it is known to provide the stator ring with abradable tracks opposite the top of the rotor vanes.

Such tracks are made of "abradable" materials that wear when rotating vanes come into contact with these tracks.

This ensures minimal clearance between the rotor and the stator, limiting air leakage and improving the performance of the rotating machine, without risking damage to the vanes if they rub against the stator.

The performance of turbojet engines is especially due to the control of these clearances between the stator and the rotor. For example, the clearances between the tops of the vanes and the abradable tracks must be kept to a minimum to reduce the pumping margin of the rotating machine.

On large diameters, these clearances are effectively controlled with the help of the abradable tracks.

In the air duct, the clearance is reduced by the vane touching the abradable track. When contact is made, the friction of the vanes on the stator abrades the abradable track, and the vane follows its path with a minimal clearance opening. The diameter of the stator ring is thus automatically adjusted as close as possible to the rotor.

Outside the air duct, a series of wipers are machined into the rotor and penetrate the abradable track forming a labyrinth for the air flow. This labyrinth has a sealing function.

The abradable seals currently used in engine areas where the temperature is below 450° C. are abradable coatings based on an aluminum-silicon alloy (Al—Si) associated with a polyester-type polymer or a hexagonal boron nitride (h-BN) type ceramic.

Figure 1:
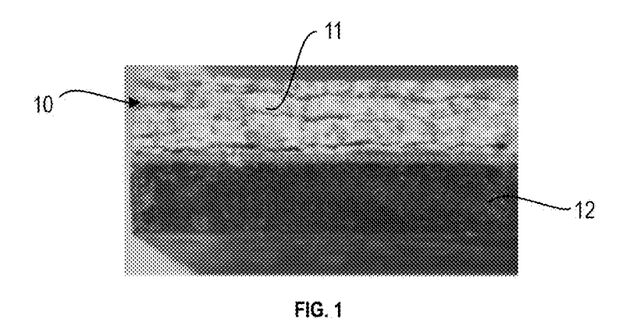
FIG. 1, already described, represents a microstructure of abradable coating composed of Al—Si and polyester, after cyclic corrosion tests, FIG. 2, already described, represents a wear map of an abradable coating composed of Al—Si and polymer, obtained by rubbing a vane, FIG. 3, already described, represents a trace left by a vane on an abradable coating composed of Al—Si and h-BN, after abradability tests.

However, these abradable coatings have a poor resistance to corrosion. The friction of the vanes on these coatings results in the creation of aluminum hydroxide compounds ($Al(OH)_3$), which induce a swelling of the abradable coating, and thus delaminations in the coating. These delaminations 10 are notably represented on FIG. 1, which represents an abradable coating 11 on a substrate 12. These coatings then lose their abradable function.

Moreover, these abradable coatings have a poor abradable behavior for low incursion speeds.

Figure 2:
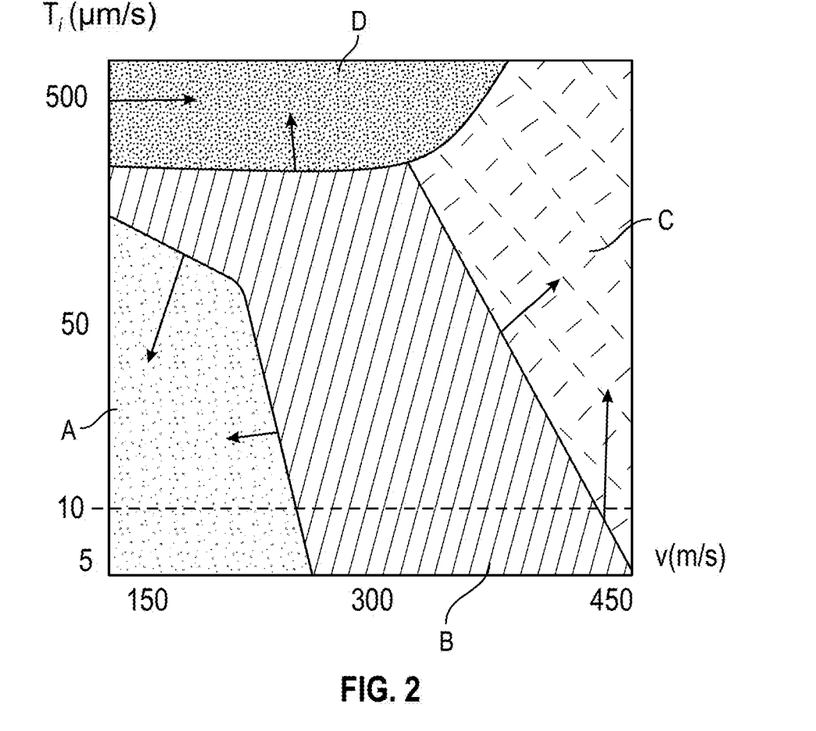
Figure 3:
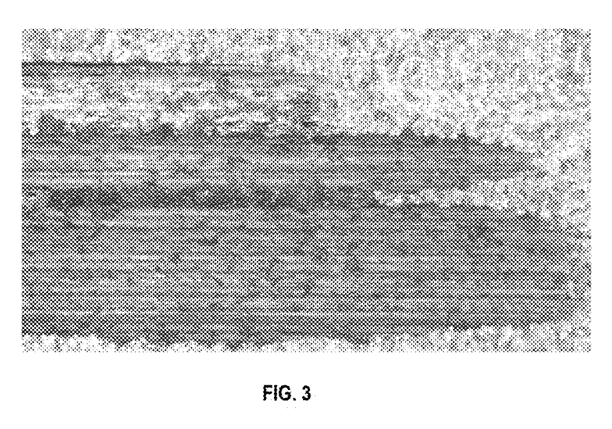

FIG. 2 shows a wear map of an abradable coating based on Al—Si and polymer obtained by rubbing a vane. This wear map represents the rate of incursion into the abradable coating (Ti) as a function of the vane speed (V). On this figure, the area A corresponds to an area of transfer of the coating on the vane, the area B corresponds to an area of furrowing of the abradable coating with a weak transfer of aluminium on the vane, the area C corresponds to an area of furrowing with microcuts of the abradable coating, and the areaD corresponds to an area of wear by fusion. The arrows indicate the wear mode of the abradable coating when it is porous.

For low incursion speeds (of the order of 10 μm/s), we observe transfers of the abradable coatings to the vanes (areas A and B of FIG. 2), and thus over-penetration (for example a penetration of 246%) and the appearance of furrows, as represented in FIG. 2. These transfers induce important losses of engine performance.

There is therefore a real need for an abradable coating for a turbomachine, as well as a turbomachine module and a turbomachine comprising such an abradable coating, free, at least in part, from the disadvantages inherent in the above-mentioned known configurations.

The purpose of the invention is to propose a solution that allows to remedy at least some of these disadvantages.

SUMMARY OF THE INVENTION

For this purpose, the invention relates to an abradable coating for a turbomachine, comprising a mineral compound, the Mohs hardness of which is less than or equal to 6 and the melting temperature of which is greater than 450° C. or even 800° C., and a polymeric compound, with a content of between 40% and 70% by volume.

In the present disclosure, "mineral compound" means a solid compound having an ordered atomic structure and a defined chemical composition. In particular, such an mineral compound may have a crystal structure characterized by the arrangement of its atoms according to a given periodicity and symmetry (crystal system and space group of the mineral compound).

In this disclosure, unless otherwise specified, the terms «lower» and «higher» are to be understood in a broad sense, i.e., as meaning «less than or equal to» and «greater than or equal to», respectively.

The abradable bi-component polymer/mineral coating according to the invention advantageously has anti-corrosion and anti-furrowing properties. Indeed, due to their physicochemical nature, the polymeric compound and the mineral compound do not corrode.

The coating according to the invention offers very good abradability and generates low aerodynamic losses. Such an abradable coating is inexpensive to produce, and offers wide machining possibilities.

Such an abradable coating is functional on an engine, without time limitation, for a temperature lower than or equal to 450° C., or even 350° C. Indeed, the polymeric compound can withstand such temperatures, without degrading the abradability of the coating, and the mineral compound can be thermally stable up to 450° C., or even 800° C.

This abradable coating has high temperature stability, making it suitable for turbomachine modules exposed to high temperatures, such as high pressure and low pressure compressors.

During the operation of the engine, vanes flush with or penetrating the abradable coating produce dust that can be explosive. With an abradable coating composed of polymer and minerals according to the invention, the absence of aluminum greatly reduces the sensitivity of the dust to self-explosion.

Furthermore, the abrasion debris is inert, which reduces its impact on the downstream part of the turbomachine. Such a coating reduces the risk of clogging the module's cooling channels.

The mineral compound is stable up to at least 450° C. and possibly 800° C.

By "stable" is meant that the mineral compound does not undergo a change of physical state (e.g., melting or phase transformation) or a chemical transformation (e.g., oxidation) when it is brought to the temperature in question from the room temperature.

According to the invention, the mineral compound may be selected from: Calcium Fluoride, Hydroxyapatite, Lanthanum Phosphate, Diatomite, Muscovite or Barium Sulfate. These mineral compounds are advantageously stable up to at least 450° C., or even 900° C., and have a hardness adapted to provide a satisfactory abradability while presenting a low roughness.

The polymeric compound may be a polyester, for example liquid crystal, or a projectable polymer (i.e., one that can be projected, in particular, by thermal spraying).

Preferably, the porosity of the abradable coating is less than 5%.

Porosity is defined as the ratio of the volume of voids present in the material to the total volume of the material. With such a reduced porosity, the roughness of the coating is reduced, even without surface treatment, which limits aerodynamic losses.

The abradable coating is preferably insoluble in water and acetone. The abradable coating may be insoluble or sparingly soluble in alcohol.

The invention also relates to a turbomachine module, comprising:
a rotor provided with a plurality of moving vane,
a stator, and
at least one abradable coating according to the invention provided at the interface between a portion of the rotor and a portion of the stator.

The module may be a high pressure compressor or a low pressure compressor for a turbomachine. The temperature in this module or this type of compressor is preferably below 350° C.

The turbomachine module may comprise at least one underlayer with a roughness Ra of between 9 μm and 40 μm, preferably on the portion of the rotor and on the portion of the stator, under the abradable coating. This underlayer allows a better adhesion of the abradable coating to the substrate to be coated. Advantageously, the rougher the underlayer, the better the adhesion of the abradable coating.

Advantageously, the roughness underlayer is located between the portion of the stator and the abradable coating.

The roughness underlayer may be composed of a Nickel-Aluminum alloy or a Nickel-Chromium-Aluminum alloy.

The invention also relates to an aircraft turbomachine comprising a module according to the invention.

The invention also relates to a method of making an abradable coating according to the invention, comprising the steps of:
mixing a powder of a mineral compound, the Mohs hardness of which is less than or equal to 6 and the melting temperature of which is greater than 450° C., or even 800° C., and a powder of a polymeric compound,
forming an abradable coating from said powder mixture, the polymeric compound having a content of between 40% and 70% by volume of the abradable coating,
applying the abradable coating to the interface between a portion of a rotor having a plurality of moving vanes and a portion of a stator of a turbomachine module.

This ensures the chemical stability of the coating up to at least 450° C.

The abradable coating can be formed by single or double injection thermal spraying, or by extrusion, or by hot molding. In particular, the abradable coating can be obtained by double injection thermal spraying for the two-component or single injection in the case of already mixed powders.

The application of the abradable coating is performed by bonding with an adhesive film or by direct injection between the portion of the rotor and the portion of the stator. At least one of the surfaces in contact with this adhesive is preferably roughened by a suitable treatment.

The abradable coating can then be machined by turning and/or milling and/or grinding.

The process may further comprise a step of applying an underlayer of roughness Ra between 9 μm and 40 μm, preferably on the rotor portion and on the stator portion, under the abradable coating.

The roughness underlayer can be composed of a Nickel-Aluminum alloy or a Nickel-Chromium-Aluminum alloy.

This roughness underlayer can be deposited on the stator portion by plasma spraying in the area. In this case, the underlayer may have a roughness Ra of 10 μm.

Alternatively, this roughness underlayer may be deposited on the stator portion by arc-wire spraying. In this case, the underlayer has a roughness Ra of 40 μm.

BRIEF DESCRIPTION OF THE FIGURES

The present invention will be better understood and further details, features and advantages of the present invention will become clearer upon reading the following non-limiting example description, with reference to the appended drawings in which.

The elements having the same functions in the different implementations have the same references in the figures.

DETAILED DESCRIPTION THE EMBODIMENTS

Figure 4:
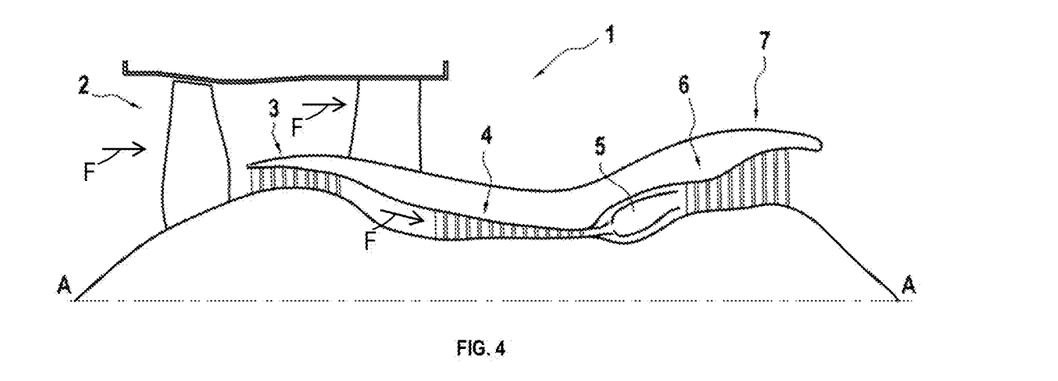
FIG. 4 shows an axial sectional view of a turbomachine according to the invention.
Figure 5:
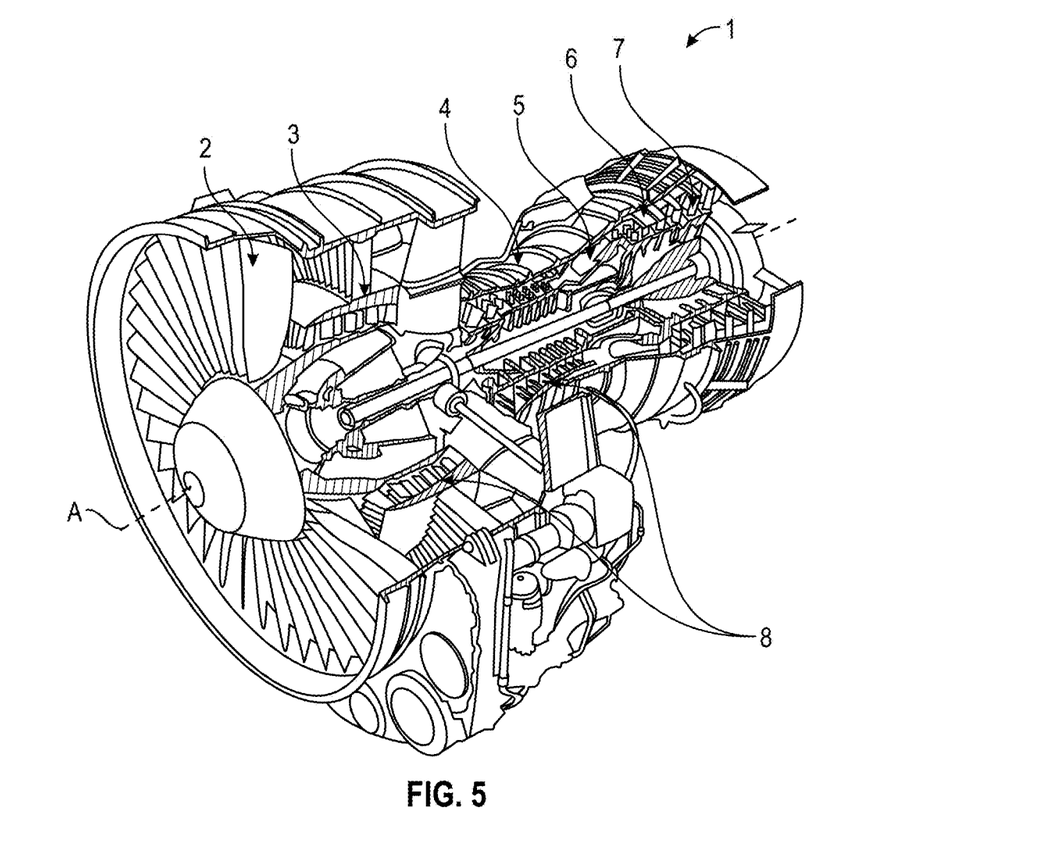
FIG. 5 represents a perspective view of a turbomachine according to the invention.

FIGS. 4 and 5 show a dual flow turbojet engine 1 extending along a main axis A, constituting an example of a turbomachine according to the invention. The turbojet engine 1 comprises, from upstream to downstream in the direction of air flow represented by arrow F, a fan 2, a low-pressure compressor 3, a high-pressure compressor 4, a combustion chamber 5, a high-pressure turbine 6 and a low-pressure turbine 7. The low-pressure compressor 3 and high-pressure compressor 4 have several compression stages.

The rotor of each compression stage comprises a plurality of moving vanes, mounted on a disc coupled to a high-pressure shaft of the turbojet engine 1. A shroud connects the disc to the disc of the previous stage.

The stator of each stage comprises a shroud, provided opposite the moving vanes of the rotor, and a plurality of fixed vanes provided opposite the rotor shroud. The shroud of the stator has abradable tracks against which the outer ends of the moving vanes of the rotor rub.

Figure 6:
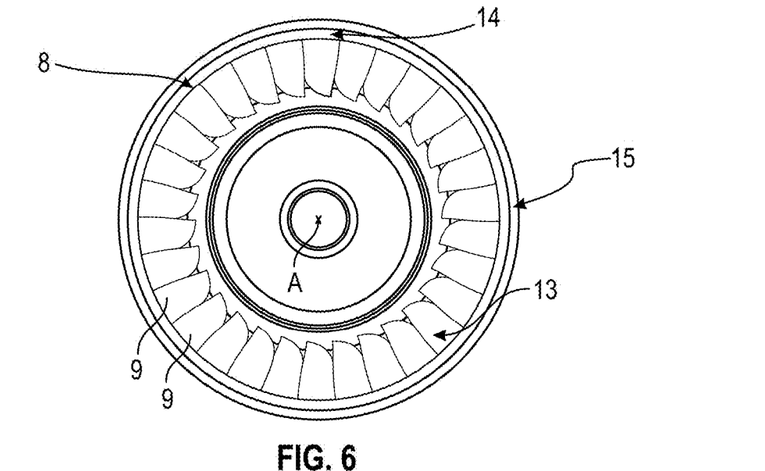
FIG. 6 represents a front view of a turbomachinery module according to the invention.

The contact areas 8 between the moving vanes 9 of the rotor 13 and the abradable tracks 14 of the stator 15 are in particular visible on FIGS. 5 and 6. The abradable tracks 14 join the tops of the vanes 9 of the rotor 13. The contact areas 8 correspond to the clearance between the tops of the vanes 9 of the rotor 13 and the abradable tracks 14.

Examples of abradable coatings for forming these abradable tracks will now be described.

The abradable coating includes a mineral compound and a polymeric compound. More specifically, the abradable coating may consist of a mineral compound and a polymeric compound. With the exception of any impurities, such abradable coating does not include any other component. In particular, this abradable coating does not include a metal compound.

The mineral compound has a Mohs hardness of less than or equal to 6, and a melting temperature greater than 450° C., or even 800° C. In other words, the mineral compound is stable at least up to 450° C. or 800° C.

The mineral compound can be selected from: Calcium Fluoride ($CaF_2$), Hydroxyapatite ($Ca_{10}(PO_4)_6(OH)_2$), Lanthanum Phosphate ($LaPO_4$), Diatomite ($SiO_2$), Muscovite ($KAl_2(AlSi_3O_{10})(OH,F)_2$) or Barium Sulfate ($BaO_4S$).

The Hydroxyapatite has a hexagonal crystal system and a 6/m space group. This mineral compound is stable up to at least 900° C. and has a hardness of 5 on the Mohs scale. In addition, this mineral compound is insoluble in water, acetone and alcohol.

The polymeric compound may be a polyester, for example liquid crystal, or a sprayable polymer, such as a thermal spraying polymer.

The abradable coating has a volume average polymeric compound content of between 40% and 70%.

The proportions of polymeric compound in the abradable coating depend on the function of the engine part. For example, the abradable coating is low in polyester (around 40% by volume of the abradable coating) for the high pressure compressor, and is higher in polyester (around 70% by volume of the abradable coating) for the low pressure compressor.

Figure 7:
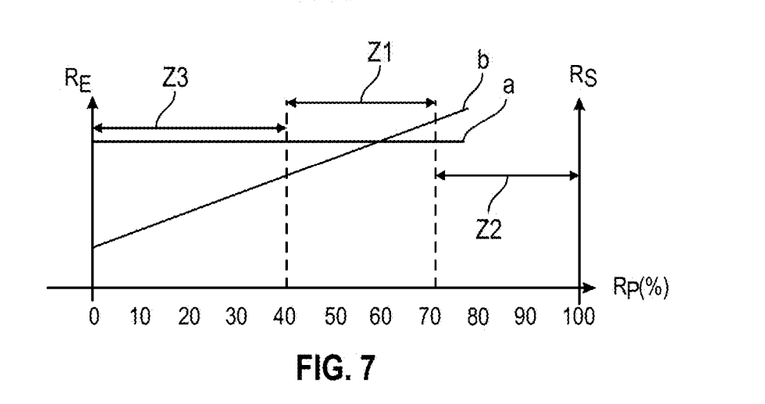
FIG. 7 is a graph representing the erosion and furrowing resistance of an abradable coating according to the invention as a function of the ratio between the mineral compound and the polymeric compound.

FIG. 7 shows the erosion resistance (RE) (i.e., anti-corrosion properties) and the furrowing resistance (RS) (i.e., anti-furrowing properties) of the abradable coating as a function of the ratio (RP) between the mineral compound and the polymeric compound.

The furrowing resistance RS (represented by curve a) is stable for an abradable coating comprising between 0% and 80% of polymeric compound, and between 20% and 100% of mineral compound, while the erosion resistance RE (represented by curve b) increases when the percentage of polymeric compound increases in the abradable coating (from 0% to 80% of polymeric compound by volume of the abradable coating), and thus when the percentage of mineral compound decreases in the abradable coating (from 100% to 20% of mineral compound by volume of the abradable coating).

In FIG. 7, the area Z1 corresponds to the optimal percentages of polymeric compound in the abradable coating. This area Z1 ranges from 40% to 70% polymeric compound by volume in the abradable coating. An abradable coating comprising such a percentage of polymeric compound by volume exhibits the optimal anti-corrosion and anti-furrowing properties.

The abradable coating according to the invention does not comprise more than 70% polymeric compound by volume. Indeed, beyond 70% of polymeric compound by volume in the abradable coating, the latter would have insufficient adhesion to the substrate, particularly in the case of an abradable coating obtained by thermal spraying. In FIG. 7, the area Z2 corresponds to the percentages of polymeric compound in the abradable coating for which the abradable coating would have insufficient adhesion to the substrate.

The abradable coating according to the invention does not comprise less than 40% polymeric compound by volume. Indeed, below 40% polymeric compound by volume in the abradable coating, the latter would have insufficient corrosion resistance. In FIG. 7, the area Z3 corresponds to the percentages of polymeric compound in the abradable coating for which the abradable coating would have insufficient erosion resistance.

Preferably, the porosity of the abradable coating is less than 5%. This porosity can be assessed by microscopic observation at a magnification of ×200.

The abradable coating is insoluble in water and acetone, sparingly soluble in alcohol, and may be soluble in engine washes. In particular, the mineral compound dissolves significantly at pH 3 and below (pH below that of acid rain).

The abradable coating can be deposited by thermal spraying on the substrate to be coated, using powders. In the case of an abradable coating composed of Hydroxyapatite and Polyester, the powder particle size before spraying of the mineral compound varies from −130 μm to +45 μm, and that of the polyester varies from −150 μm or −145 μm to +45 μm.

In the case of single injection thermal spraying, the powders of the mineral compound and the polymeric compound are mixed beforehand and then the powder mixture is sprayed onto the substrate to be coated by means of a plasma torch.

Figure 8:
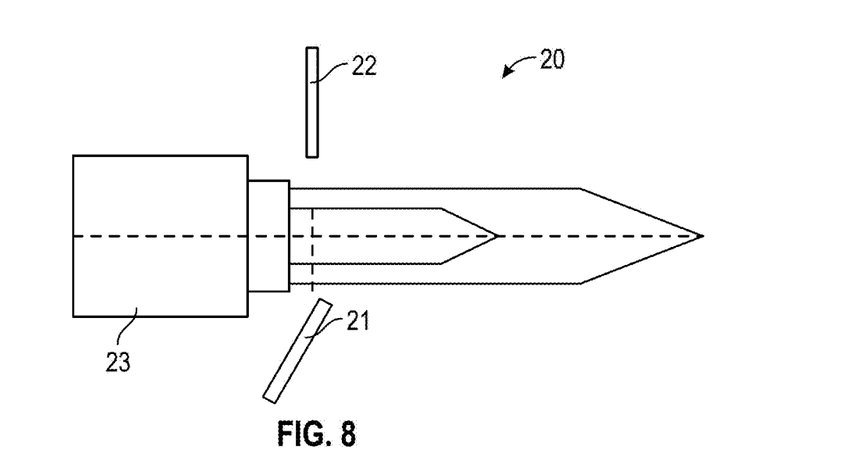
FIG. 8 shows a double injection thermal spraying device.

In the case of a double injection thermal spraying, the powders of the mineral compound and the polymeric compound are mixed during the spraying on the substrate to be coated. FIG. 8 shows a double injection thermal spraying device. This device 20 includes a mineral compound injector 21, a polymeric compound injector 22 and a plasma torch 23. The mineral compound and the polymeric compound are injected into the plasma torch beam, which projects them onto the substrate to be coated.

Figure 9:
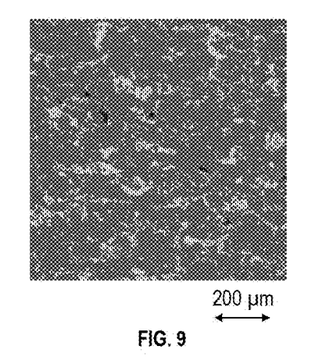
FIGS. 9 and 10 represent a microstructure of an abradable coating according to the invention composed of Hydroxyapatite and Polyester.
Figure 10:
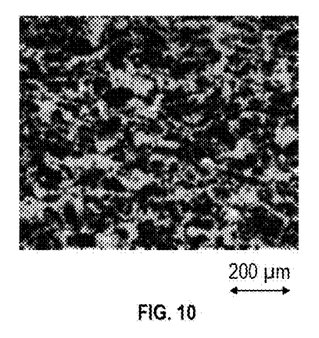
Figure 11:
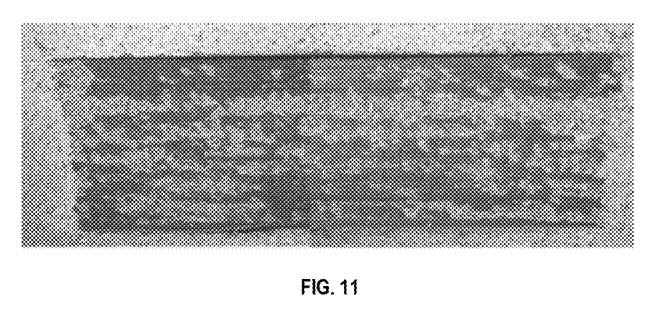
FIG. 11 represents a trace left by a vane on an abradable coating according to the invention composed of Hydroxyapatite and Polyester, after abradability tests.

The abradable coating can be machined by any known technique, including turning, milling, or grinding. After surface machining, an abradable coating is obtained as shown in FIG. 9, whose microstructure is visible in FIG. 10. The porosity rate of this abradable coating is less than or equal to 5%.

The abradability of this abradable coating (evaluated according to DMC 0420) is in the range of 100%-130%. With such an abradable coating, there is no vane wear.

The DMC 0420 test evaluates the performance of an abradable coating using the A/O (Abradability to Overpenetration) ratio, which is measured using a measuring device not shown in the drawings: three simulated vanes are arranged protruding from the perimeter of a rotating wheel. An abradable sample to be tested is placed below the rotating wheel. The rotating wheel advances at constant speed towards the abradable sample and penetrates it to a set depth. The actual depth dug into the abradable is then measured and the ratio of the set depth to the dug depth is calculated. This ratio is called the A/O ratio and is expressed as a percentage.

The abradable coating composed of Hydroxyapatite and Polyester can be deposited on the substrate to be coated, preferably a low pressure compressor, according to another technique. The Hydroxyapatite and Polyester powders are mixed and then extruded or heat molded to form a ring. This ring is an abradable track blank, which is then bonded to the substrate to be coated or directly injected onto the substrate, for example the casing of the low pressure compressor. The abradable track blank can be bonded by means of an adhesive film. Alternatively, in order to minimize the thickness of the adhesive seal and to ensure better adhesion of the abradable coating to the substrate, the ring can be inserted cold. The bonding is then carried out by baking in a furnace, for example at a temperature of about 175° C. The abradable track is then machined to the desired dimensions.

An adhesive underlayer can be added between the substrate to be coated and the abradable coating. The abradable coating is more adherent the rougher the underlayer. Preferably, the underlayer has a roughness Ra between 9 µm and 40 µm. For example, the underlayer can be composed of a Nickel-Aluminum (NiAl) alloy or a Nickel-Chromium-Aluminum (NiCrAl) alloy deposited on the substrate by plasma spraying in air. Such an underlayer has a roughness Ra of about 10 µm. The underlayer can be composed of NiAl or NiCrAl deposited by arc-wire spraying. Such an underlayer has a roughness Ra of about 40 µm.

The invention claimed is:

1. An abradable coating for a turbomachine, comprising:
   a mineral compound, the Mohs hardness of which is less than or equal to 6 and the melting temperature of which is greater than 450° C., and
   a polymeric compound, with a content of between 40% and 70% by volume of the abradable coating,
   wherein the mineral compound is selected from: calcium fluoride, hydroxyapatite, lanthanum phosphate, diatomite, muscovite or barium sulfate, and
   wherein the porosity is less than 5%.

2. The abradable coating according to claim 1, wherein the polymeric compound is a polyester or a projectable polymer.

3. The abradable coating according to claim 1, wherein the mineral compound is hydroxyapatite and the polymeric compound is polyester.

4. The abradable coating according to claim 1, wherein the coating is insoluble in water and acetone.

5. A turbomachine module, comprising:
   a rotor provided with a plurality of moving vanes,
   a stator, and
   at least one abradable coating according to claim 1 provided at an interface between a portion of the rotor and a portion of the stator.

6. The module according to claim 5, comprising at least one underlayer with a roughness Ra between 9 µm and 40 µm on the portion of the rotor and on the portion of the stator, under the abradable coating.

7. The module according to claim 6, wherein the roughness underlayer is located between the portion of the stator and the abradable coating.

8. The module according to claim 6, wherein the roughness underlayer is composed of a Nickel-Aluminum alloy or a Nickel-Chromium-Aluminum alloy.

9. An aircraft turbomachine comprising a module according to claim 5.

10. A method of making the abradable coating according to claim 1, comprising the steps of:
    mixing a powder of the mineral compound and a powder of the polymeric compound,
    forming the abradable coating from said powder mixture,
    applying the abradable coating to an interface between a portion of a rotor having a plurality of moving vanes and a portion of a stator of a turbomachine module.

11. The method of claim 10, wherein the formation of the abradable coating is performed by single or double injection thermal spraying, extrusion, or hot molding.

12. The method of claim 10, wherein the application of the abradable coating is performed by bonding with an adhesive film or by direct injection between the portion of the rotor and the portion of the stator.

13. The method according to claim 10, wherein a roughness underlayer is deposited on the stator portion by plasma spraying in the area, wherein said underlayer has a roughness Ra of 10 µm and said underlayer is composed of a Nickel-Aluminum alloy or a Nickel-Chromium-Aluminum alloy.

14. The method of claim 10, wherein a roughness underlayer is deposited on the stator portion by arc-wire spraying, said underlayer has a roughness Ra of 40 µm and said underlayer is composed of a Nickel-Aluminum alloy or a Nickel-Chromium-Aluminum alloy.

15. The abradable coating according to claim 1, wherein the mineral compound has a content of between 30% and 60% by volume of the abradable coating.

16. The abradable coating according to claim 1, wherein the polymeric compound is a liquid crystal polyester.

17. An abradable coating for a turbomachine, comprising:
    a mineral compound, the Mohs hardness of which is less than or equal to 6 and the melting temperature of which is greater than 450° C., and
    a polymeric compound, with a content of between 40% and 70% by volume of the abradable coating,
    wherein the mineral compound is selected from: calcium fluoride, hydroxyapatite, lanthanum phosphate, diatomite, muscovite or barium sulfate,
    wherein the mineral compound is hydroxyapatite and the polymeric compound is polyester.

18. An abradable coating for a turbomachine, comprising:
    a mineral compound, the Mohs hardness of which is less than or equal to 6 and the melting temperature of which is greater than 450° C., and
    a polymeric compound, with a content of between 40% and 70% by volume of the abradable coating,
    wherein the mineral compound is selected from: calcium fluoride, hydroxyapatite, lanthanum phosphate, diatomite, muscovite or barium sulfate,
    wherein the coating is insoluble in water and acetone.

19. A turbomachine module, comprising:
    a rotor provided with a plurality of moving vanes,
    a stator, and
    at least one abradable coating according to claim 17 provided at the interface between a portion of the rotor and a portion of the stator.

20. A turbomachine module, comprising:
    a rotor provided with a plurality of moving vanes,
    a stator, and at least one abradable coating according to claim 18 provided at the interface between a portion of the rotor and a portion of the stator.

21. An aircraft turbomachine comprising a module according to claim 19.

22. An aircraft turbomachine comprising a module according to claim 20.

23. A turbomachine module, comprising:

a rotor provided with a plurality of moving vanes, a stator, and at least one abradable coating provided at the interface between a portion of the rotor and a portion of the stator, said at least one abradable coating comprising:

a mineral compound, the Mohs hardness of which is less than or equal to 6 and the melting temperature of which is greater than 450° C., and a polymeric compound, with a content of between 40% and 70% by volume of the abradable coating, wherein the mineral compound is selected from: calcium fluoride, hydroxyapatite, lanthanum phosphate, diatomite, muscovite or barium sulfate, wherein the turbomachine module comprising at least one underlayer with a roughness Ra between 9 μm and 40 μm on the portion of the rotor and on the portion of the stator, under the abradable coating.

24. An aircraft turbomachine comprising a module according to claim 23.

\* \* \* \* \*